(12) United States Patent
Hou

(10) Patent No.: US 10,377,574 B2
(45) Date of Patent: Aug. 13, 2019

(54) CONVEYOR BELT WEAR MONITORING SYSTEM

(71) Applicant: The Yokohama Rubber Co., LTD., Minato-ku, Tokyo (JP)

(72) Inventor: Gang Hou, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/570,713

(22) PCT Filed: Mar. 10, 2016

(86) PCT No.: PCT/JP2016/057532
§ 371 (c)(1),
(2) Date: Oct. 30, 2017

(87) PCT Pub. No.: WO2016/174941
PCT Pub. Date: Nov. 3, 2016

(65) Prior Publication Data
US 2018/0354725 A1  Dec. 13, 2018

(30) Foreign Application Priority Data
Apr. 30, 2015 (JP) .................. 2015-092687

(51) Int. Cl.
*B65G 43/02* (2006.01)
*B65G 45/12* (2006.01)
*G01B 21/16* (2006.01)

(52) U.S. Cl.
CPC .......... *B65G 43/02* (2013.01); *B65G 45/12* (2013.01); *G01B 21/16* (2013.01); *B65G 2203/043* (2013.01); *B65G 2203/044* (2013.01); *B65G 2207/48* (2013.01)

(58) Field of Classification Search
CPC .. B65G 43/02; B65G 45/12; B65G 2203/044; B65G 2207/48; B65G 2203/043
USPC ....................................... 198/810.02
See application file for complete search history.

(56) References Cited

U.S. PATENT DOCUMENTS

| 8,618,929 | B2 | 12/2013 | Ganapathy et al. |
| 2009/0266684 | A1 | 10/2009 | Nishikita |
| 2011/0050213 | A1* | 3/2011 | Furukawa .............. B65G 43/02 324/228 |

(Continued)

FOREIGN PATENT DOCUMENTS

| CN | 102666319 | 9/2012 |
| JP | S57-125347 | 8/1982 |

(Continued)

OTHER PUBLICATIONS

International Search Report for International Application No. PCT/JP2016/057532 dated Jun. 14, 2016, 4 pages.

*Primary Examiner* — James R Bidwell
(74) *Attorney, Agent, or Firm* — Thorpe North & Western

(57) ABSTRACT

Provided is a conveyor belt wear monitoring system including a non-contact sensor arranged facing a surface of an upper cover rubber. A distance to the surface of the upper cover rubber is detected using the non-contact sensor in a predetermined range in a belt width direction of the upper cover rubber of the traveling conveyor belt. An amount of wear of the upper cover rubber is obtained by comparing the detection data with pre-stored reference data.

9 Claims, 5 Drawing Sheets

(56) References Cited

U.S. PATENT DOCUMENTS

2012/0306481 A1   12/2012  Nakamura et al.
2016/0327517 A1*  11/2016  Sakaguchi ............. B65G 43/02
2017/0313523 A1   11/2017  Hou

FOREIGN PATENT DOCUMENTS

| JP | H03-113316 | 11/1991 |
|----|------------|---------|
| JP | 2009-012957 | 1/2009 |
| JP | 2009-166947 | 7/2009 |
| JP | 2010-052927 | 3/2010 |
| JP | 2012-030952 | 2/2012 |
| WO | WO 2007/029698 | 3/2007 |
| WO | WO 2009/091019 | 7/2009 |
| WO | WO 2011/058755 | 5/2011 |
| WO | WO 2013/053013 | 4/2013 |
| WO | WO 2016/075981 | 5/2016 |

* cited by examiner

CONVEYOR BELT WEAR MONITORING SYSTEM

TECHNICAL FIELD

The present technology relates to a conveyor belt wear monitoring system, and particularly relates to a conveyor belt wear monitoring system capable of accurately and efficiently determining the wear condition of a desired range of a cover rubber.

BACKGROUND ART

Various objects, including mineral resources such as iron ore and limestone, are conveyed by a conveyor belt. When being conveyed by the conveyor belt, the objects to be conveyed are fed onto an upper cover rubber of the conveyor belt from a hopper or another conveyor belt. The fed objects to be conveyed are loaded on the upper cover rubber and conveyed in a travel direction of the conveyor belt. Here, the upper cover rubber is subject to wear as a result of the objects to be conveyed sliding on the upper cover rubber. When a conveyor belt with reduced tolerance strength due to wear caused by the objects to be conveyed is continuously used, the conveyor belt may suddenly sever, forcing the cessation of operations. For repairs, great amounts of time and costs are required. To prevent such problems, technologies for detecting the wear condition of conveyor belts are known (see for example Japanese Unexamined Patent Application Publication No. 2010-52927A).

According to the technology disclosed in Japanese Unexamined Patent Application Publication No. 2010-52927A, magnets are embedded in a conveyor belt, magnetism of the magnets is detected by a magnetism sensor, and the wear condition of the conveyor belt is detected on the basis of that measurement data. Although this method allows the wear condition of the range in which the magnets are embedded to be actually detected, the wear condition of the range in which magnets are not embedded cannot actually be detected, and can thus only be estimated.

Rather than being uniform across the entire range, the time-dependent wear condition of a conveyor belt varies. Wear can also arise locally for various reasons. Determining the wear condition of the range having the heaviest wear or an abnormal wear condition is important for preventing the conveyor belt from being severed. However, such wear conditions do not necessarily arise in the ranges where the magnets are embedded. Thus, to determine the wear condition of a desired range of a conveyor belt using the conventional method of embedding magnets in the conveyor belt, it is necessary to embed the magnets throughout a broad range, which is unrealistic. Therefore, means for accurately and efficiently determining the wear condition of a desired range of a conveyor belt has been required.

SUMMARY

The present technology provides a conveyor belt wear monitoring system capable of accurately and efficiently determining the wear condition of a desired range of a cover rubber.

A conveyor belt wear monitoring system according to an aspect of the present technology to achieve the above-described object includes: a non-contact sensor disposed facing a surface of a cover rubber of a conveyor belt, the non-contact sensor being configured to detect a distance to the surface of the cover rubber in a predetermined range in a belt width direction; and a calculation unit into which detection data from the non-contact sensor is inputted. The calculation unit obtains an amount of wear of the cover rubber by comparing pre-stored reference data with the detection data.

According to the present technology, the configuration in which the position in the belt width direction of the range detected by the non-contact sensor is set as desired and the conveyor belt is forced to travel allows the distance from the non-contact sensor to the surface of the cover rubber to be detected in a non-contact manner in the desired range of the cover rubber. The amount of wear of the cover rubber can be obtained for the detected range from a result of comparing the reference data with the detection data from the non-contact sensor. The detection by the non-contact sensor can actually be carried out on the desired range of the cover rubber, which is advantageous in that the amount of wear can be obtained accurately, as compared to a case where the amount of wear is estimated. Additionally, the non-contact sensor can carry out detection while the conveyor belt is traveling, and thus the wear condition in the desired range can be determined efficiently and in a short amount of time.

The configuration can be such that a flapping prevention member that comes into contact with a surface of the cover rubber on the opposite side of the surface of the cover rubber detected by the non-contact sensor is further included, and the flapping prevention member is arranged in a position corresponding to a detection range detected by the non-contact sensor. According to this configuration, flapping caused by the travel of the conveyor belt can is suppressed by the flapping prevention member in the detection range of the non-contact sensor. This is advantageous in terms of improving the accuracy of the detection by the non-contact sensor.

The configuration can be such that a scraper that comes into contact with the surface of the cover rubber detected by the non-contact sensor is further included, and the non-contact sensor detects the distance to the surface of the cover rubber after the surface passes the scraper due to travel of the conveyor belt. According to this configuration, when an object adheres to the surface of the cover rubber, the adhering object is removed by the scraper before the detection by the non-contact sensor. This is advantageous in terms of improving the accuracy of the detection by the non-contact sensor.

The configuration can be such that the non-contact sensors are arranged at intervals in a width direction of the conveyor belt. According to this configuration, the wear condition of a broader range of the surface of the cover rubber can be determined all at once.

The configuration can be such that the non-contact sensors are arranged in a plurality of positions at intervals in a longitudinal direction of the conveyor belt. According to this configuration, variation in the detection accuracy of the non-contact sensors can be determined from a result of comparing pieces of detection data from the non-contact sensors in the respective positions in the longitudinal direction of the conveyor belt. Furthermore, this configuration makes it possible to discover a malfunction in the non-contact sensor(s) arranged at any of the positions.

The configuration can be such that a reference member fixed to a reference position of the conveyor belt and a position sensor fixed near the conveyor belt are further included and the position sensor detects the reference member that moves as the conveyor belt travels, and on the basis of a detection signal from the position sensor and a travel speed of the conveyor belt, a position in a circumferential direction of the conveyor belt having the obtained amount of wear is identified. According to this configuration, the wear condition in a desired range of the surface of the cover rubber can be determined more reliably, and time-dependent changes in the desired range can be determined accurately.

DETAILED DESCRIPTION

Figure 1:
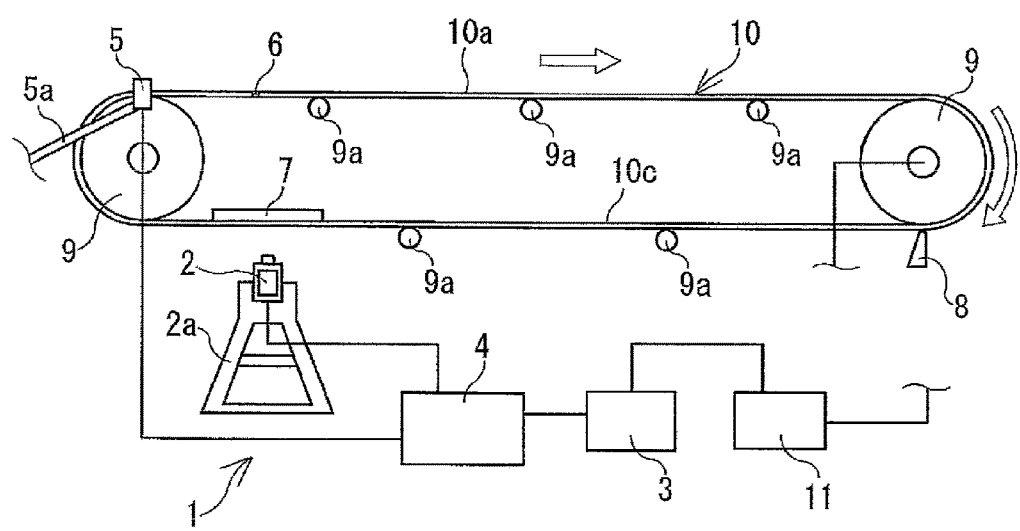
FIG. 1 is an explanatory diagram illustrating a conveyor belt in a side view to which a conveyor belt wear monitoring system of an embodiment of the present technology is applied.

A conveyor belt wear monitoring system of the present technology will be described below based on embodiments illustrated in the drawings.

Figure 5:
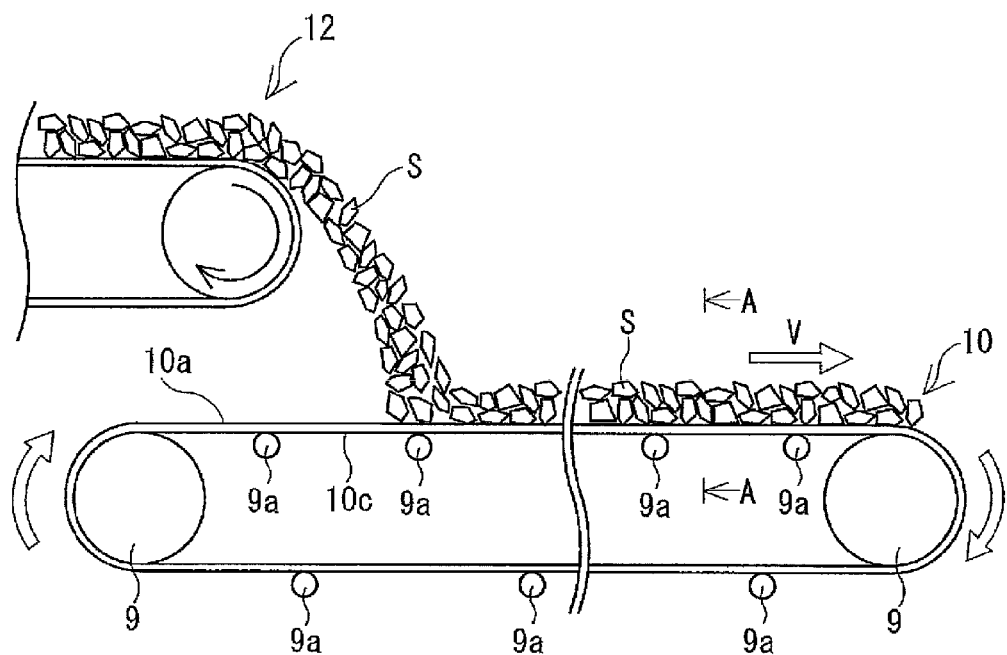
FIG. 5 is an explanatory diagram illustrating a conveyor belt line in a simplified manner.
Figure 6:
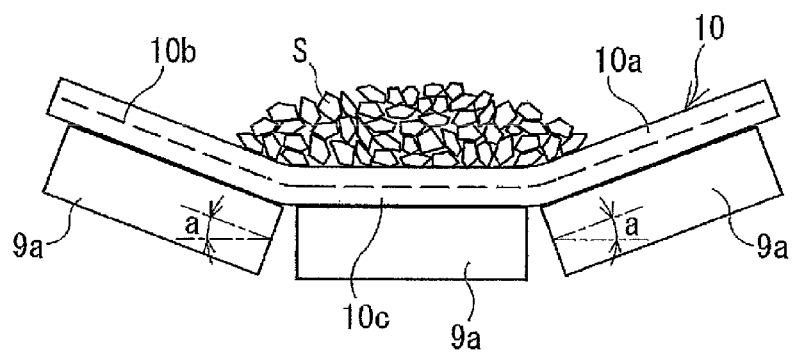
FIG. 6 is cross-sectional view taken along A-A of FIG. 5.

As illustrated in FIGS. 5 and 6, in a functioning conveyor belt line, objects to be conveyed S is conveyed by another conveyor belt 12, fed onto a conveyor belt 10, and conveyed to a conveying destination by the conveyor belt 10. The objects to be conveyed S may be fed onto the conveyor belt 10 by a hopper and the like. The conveyor belt 10 is stretched at a prescribed tension between pulleys 9.

The conveyor belt 10 includes a core layer 10b including a core made of canvas, steel cord, or the like, and an upper cover rubber 10a and a lower cover rubber 10c that sandwich the core layer 10b therebetween. The core layer 10b is a member that bears the tension that causes the conveyor belt 10 to be stretched. The lower cover rubber 10c is supported by support rollers 9a on a carrier side of the conveyor belt 10 (a side that travels with the objects to be conveyed S placed thereon), and the upper cover rubber 10a is supported by support rollers 9a on a return side (a side that travels without the objects to be conveyed S placed thereon). Three support rollers 9a are arranged on the carrier side of the conveyor belt 10 in the belt width direction. The conveyor belt 10 is supported by these support rollers 9a in a concave shape having a prescribed trough angle a. When a pulley 9 on a drive side is rotationally driven, the conveyor belt 10 travels in one direction at a prescribed travel speed V. The objects to be conveyed S are fed onto the upper cover rubber 10a, and are loaded on the upper cover rubber 10a and conveyed.

Figure 2:
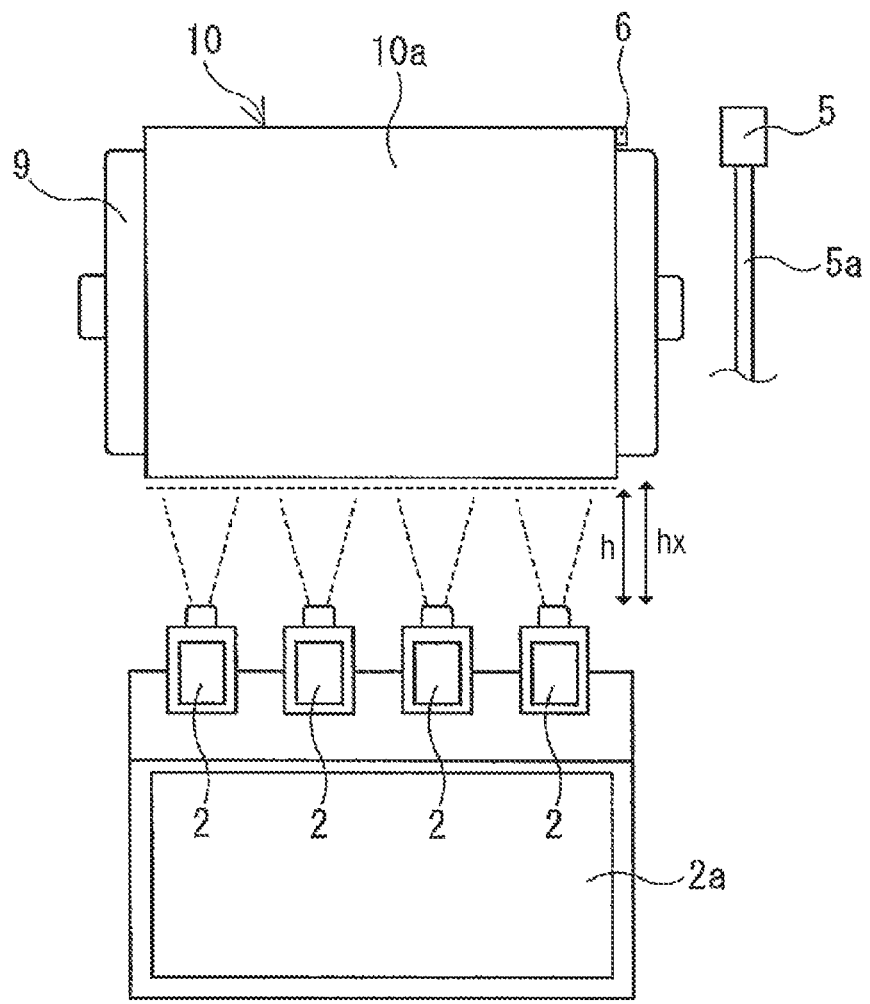
FIG. 2 is an explanatory diagram illustrating non-contact sensors and a position sensor along with the conveyor belt illustrated in FIG. 1, in a front view.

A conveyor belt wear monitoring system 1 (referred to below as a "system 1") of an embodiment of the present technology illustrated in FIGS. 1 and 2 is to be applied to the conveyor belt 10 of a functioning conveyor belt line.

This system 1 includes non-contact sensors 2 that detect a distance hx to a surface of the upper cover rubber 10a, and a calculation unit 3 into which detection data from the non-contact sensors 2 is inputted. Examples of the non-contact sensors 2 include laser sensors, ultrasonic sensors, and image sensors that capture images of the surface of the upper cover rubber 10a to detect a distance and acquire the state of the surface of the upper cover rubber 10a three-dimensionally. Although both the upper cover rubber 10a and the lower cover rubber 10c are to be detected by the non-contact sensors 2, a case where the upper cover rubber 10a is to be detected will be described in the following embodiments.

The non-contact sensors 2 are attached to a sensor installation platform 2a arranged in proximity to the conveyor belt 10, and are arranged facing the surface of the upper cover rubber 10a on the return side of the conveyor belt 10. The non-contact sensors 2 are each configured to detect a given range of the surface of the upper cover rubber 10a in the belt width direction (for example, a range from 30 mm to 300 mm in the belt width direction). In this embodiment, the non-contact sensors 2 are arranged in a row at intervals in the belt width direction. The detection ranges of the arranged non-contact sensors 2 are located adjacent to each other with substantially no gap therebetween.

Various types of computers can be used as the calculation unit 3. The calculation unit 3 stores reference data h serving as a reference when obtaining an amount of wear H of the upper cover rubber 10a.

In this embodiment, a control unit 4 connected to the non-contact sensors 2 is connected to the calculation unit 3. In other words, the control unit 4 is interposed between the non-contact sensors 2 and the calculation unit 3. The control unit 4 controls the detection frequency, detection sensitivity, and the like of the non-contact sensors 2. Alternatively, a device including both the calculation unit 3 and the control unit 4 can be used. The conveyor belt line is provided with a travel control device 11 that controls the travel speed, travel time, stop time, and the like of the conveyor belt 10. The calculation unit 3 is connected to the travel control device 11.

A position sensor 5 attached to a sensor installation platform 5a is installed near a side surface or the like of the conveyor belt 10. A reference member 6 is fixed to a reference position set in the conveyor belt 10 as appropriate (a predetermined position on a side surface of the belt, for example). The position sensor 5 issues a detection signal upon the reference member 6 approaching a detectable range as the conveyor belt 10 travels. For example, a member such as a metal piece or a magnet is used as the reference member 6, and a proximity switch or the like that reacts to such a member is employed as the position sensor 5. The detection signal from the position sensor 5 is inputted to the calculation unit 3 via the control unit 4. Alternatively, the detection signal can be inputted directly into the calculation unit 3.

Additionally, a flapping prevention member 7 is provided in contact with the surface of the lower cover rubber 10c on the opposite side of the surface of the upper cover rubber 10a that is to be detected by the non-contact sensors 2. The flapping prevention member 7 has a flat plate shape, for example, and is arranged in a position corresponding to the detection range of the upper cover rubber 10a detected by the non-contact sensors 2. In other words, the non-contact sensors 2 and the flapping prevention member 7 are arranged opposite each other with the conveyor belt 10 therebetween.

Furthermore, in this embodiment, a scraper 8 is provided in contact with the surface of the upper cover rubber 10a that is to be detected by the non-contact sensors 2. The scraper 8 is arranged upstream from the non-contact sensors 2 in the travel direction, on the return side of the conveyor belt 10. A known scraper 8 can be used, and the configuration is such that while the conveyor belt 10 travels, the surface of the conveyor belt 10 is detected by the non-contact sensors 2 after passing the scraper 8.

A method of determining and monitoring the wear condition of the upper cover rubber 10a using this system 1 will be described next.

The system 1 carries out detection using the non-contact sensors 2 while the conveyor belt 10 is traveling, and detects the amount of wear H of the upper cover rubber 10a.

The non-contact sensors 2 successively detect the distance hx from a starting point such as the sensor tips to the surface of the upper cover rubber 10a, for a detection range of a predetermined belt width. The conveyor belt 10 is traveling, and thus when the non-contact sensors 2 carry out detection during a single revolution of the conveyor belt 10, each non-contact sensor 2 can acquire data for the entire circumference of the conveyor belt 10 within the range of the predetermined belt width.

Accordingly, by determining the number of non-contact sensors 2 installed and their installation positions as appropriate, setting the position in the belt width direction of the detection range of the non-contact sensors 2 as appropriate, and causing the conveyor belt 10 to travel, the distance hx from the non-contact sensors 2 to the surface of the upper cover rubber 10a can be detected in a non-contact manner in a desired range of the upper cover rubber 10a.

The detection data (the distance hx) from the non-contact sensors 2 is inputted to the calculation unit 3. The reference data h, which is compared with this detection data hx, is stored in the calculation unit 3 in advance. Detection data detected by the non-contact sensors 2 the previous time, for example, is used as the reference data h for the range detected by the non-contact sensors 2 this time. By comparing the current detection data hx with the reference data h, the amount of wear H of the upper cover rubber 10a arising between the previous detection and the current detection (=hx−h) can be obtained for current detection range. If the reference data h is updated with each revolution of the conveyor belt 10, the amount of wear H of the upper cover rubber 10a can be determined continuously in real time.

Figure 3:
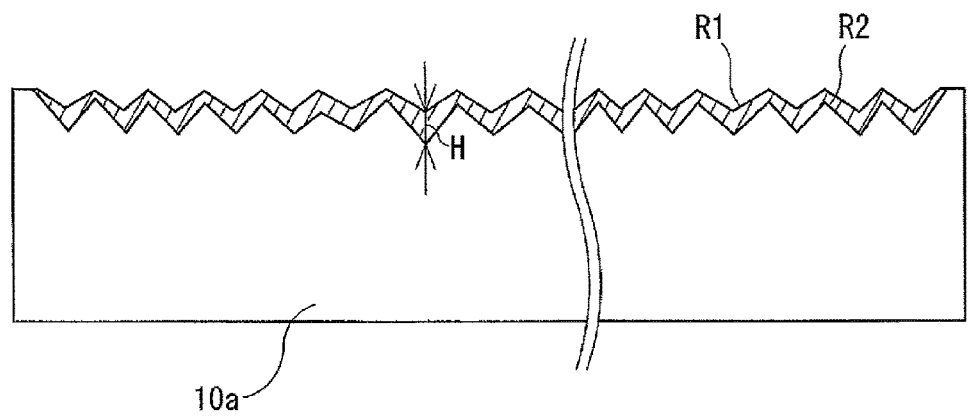
FIG. 3 is an explanatory diagram illustrating, in a lateral cross-sectional view, an amount of wear of the belt that has been obtained.

For example, the amount of wear H can be determined as illustrated in FIG. 3, which is a lateral cross-sectional view in the belt width direction. In FIG. 3, a zigzag line R1 indicates the position of the surface of the upper cover rubber 10a detected the previous time, and a zigzag line R2 indicates the position of the surface of the upper cover rubber 10a detected this time. The vertical interval between the zigzag lines R1 and R2 corresponds to the amount of wear H.

Figure 4:
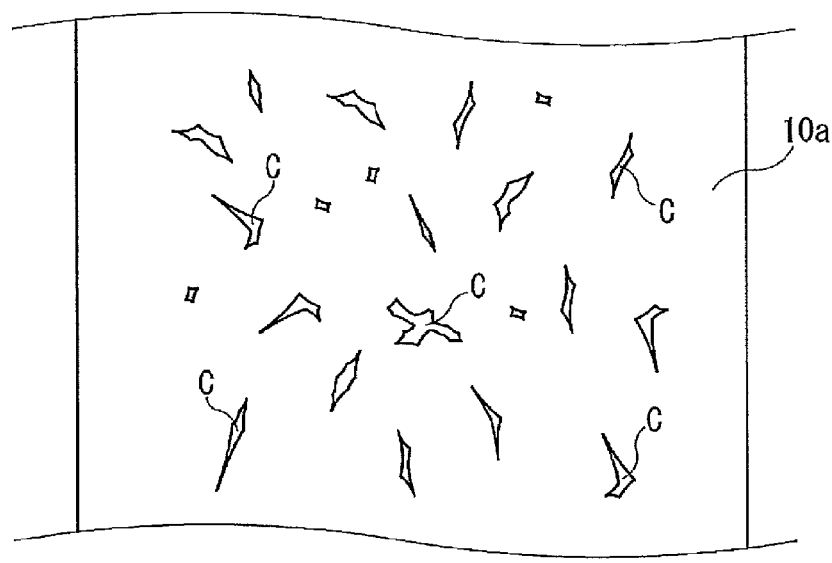
FIG. 4 is an explanatory diagram illustrating, in a plan view, an amount of wear of the belt that has been obtained.

When, for example, image sensors that are capable of capturing images of the surface of the upper cover rubber 10a to detect the distance hx and acquire the state of the surface of the upper cover rubber 10a three-dimensionally are used as the non-contact sensors 2, detection data such as that indicated in FIG. 4 can be obtained. With this detection data, the state of the surface of the upper cover rubber 10a appears on a monitor three-dimensionally, with cavities C indicated in colors darker than the peripheral portions thereof. Accordingly, differences in the amount of wear H can be determined at a glance on the basis of variance in display color.

According to the system 1 of the present technology as described thus far, the configuration is employed in which the non-contact sensors 2 are disposed in an appropriate position and detect the distance hx to the surface of the upper cover rubber 10a while the conveyor belt 10 is traveling, which enables the actual distance hx to be detected for a desired range of the upper cover rubber 10a. This is advantageous in that the amount of wear H can be obtained more accurately than by estimation. The non-contact sensors 2 carry out detection while the conveyor belt 10 is traveling, and thus the wear condition in the desired range of the surface of the upper cover rubber 10a can be determined efficiently and in a short amount of time.

When comparing the previous detection data with the current detection data, it is necessary for both the pieces of data to have been detected at the same position on the conveyor belt 10 (the same position in the circumferential direction). According to this embodiment, when the reference member 6 that moves as the conveyor belt 10 travels has reached (become closest to) the detection range of the position sensor 5, the position sensor 5 issues the detection signal. This detection signal is inputted to the calculation unit 3 via the control unit 4. The positions of the position sensor 5 and the non-contact sensors 2 are already known. As such, the circumferential direction position on the surface of the upper cover rubber 10a detected by the non-contact sensors 2 is found upon the detection signal being issued from the position sensor 5. The travel speed of the conveyor belt 10 is inputted to the calculation unit 3 from the travel control device 11. Accordingly, the circumferential direction position of the conveyor belt 10 in the detection range of the non-contact sensors 2 is continually found on the basis of the detection signal from the position sensor 5 and the travel speed of the conveyor belt 10. As a result, the circumferential direction position of the conveyor belt 10 having the amount of wear H obtained by the calculation unit 3 is continually identified. According to this configuration, the wear condition in a desired range of the surface of the upper cover rubber 10a can be determined more reliably. In addition, time-dependent changes in the desired range can be determined accurately.

A maximum allowable amount of wear H of the upper cover rubber 10a can be stored in the calculation unit 3, for example. A configuration is possible in which an alert is issued upon the amount of wear H obtained by the calculation unit 3 reaching the maximum amount of wear H. Example of such an alert include issuing a warning, and displaying an alert on a monitor. A configuration is also possible in which the calculation unit 3 issues an instruction to the travel control device 11 to stop the travel of the conveyor belt 10 upon the amount of wear H reaching the maximum amount of wear H.

Although the objects to be conveyed S are not placed on the upper cover rubber 10a on the return side of the conveyor belt 10, some of the objects to be conveyed S remain and adhere to the upper cover rubber 10a. Thus, it is preferable that these adhering objects be removed by the scraper 8. Detecting the distance hx to the surface of the upper cover rubber 10a after passing the scraper 8 in this manner is advantageous in terms of improving the accuracy of the detection by the non-contact sensors 2, and allows the distance hx to be detected more accurately, which in turn makes the obtained amount of wear H more accurate.

Additionally, according to this embodiment, in the detection range of the non-contact sensors 2, the surface of the lower cover rubber 10c of the traveling conveyor belt 10 slides lightly along the flapping prevention member 7. As a result, the flapping prevention member 7 suppresses flapping arising as the conveyor belt 10 travels, which is advantageous in terms of improving the accuracy of the detection by the non-contact sensors 2.

As in this embodiment, arranging the non-contact sensors 2 at intervals in the width direction of the conveyor belt 10 allows the wear condition of a broader range of the surface of the upper cover rubber 10a to be determined all at once.

Note that a central portion of the upper cover rubber 10a in the belt width direction, on which the objects to be conveyed S are placed, tends to suffer heavy wear, as illustrated in FIG. 6. Accordingly, the range in which the distance hx is detected by the non-contact sensors 2 can also be limited to the central portion in the belt width direction, for example.

The non-contact sensors 2 can also be arranged in a plurality of positions at intervals in a longitudinal direction of the conveyor belt 10. Specifically, the non-contact sensors 2 are arranged in a plurality of positions at intervals in the belt longitudinal direction, on the return side of the conveyor belt 10. According to this configuration, variation in the detection accuracy of the non-contact sensors 2 can be determined from a result of comparing pieces of detection data from the non-contact sensors 2 in the respective longitudinal direction positions. Additionally, when the variation in the pieces of detection data from the respective positions is excessive, it is likely that non-contact sensor(s) 2 arranged in any of the positions has malfunctioned, which enables the early discovery of a malfunction in the non-contact sensor(s) 2.

The wear condition of the lower cover rubber 10c can also be determined and monitored in the same manner as the upper cover rubber 10a. Detecting the distance hx to the surface of the lower cover rubber 10c using the non-contact sensors 2 can be carried out on both the carrier side and the return side of the conveyor belt 10. However, on the return side of the conveyor belt 10, no objects to be conveyed S are placed, which makes the behavior of the conveyor belt 10 more stable. Furthermore, the conveyor belt 10 has a flat shape rather than a trough shape on the return side. Therefore, it is preferable that the detection using the non-contact sensors 2 be carried out on the return side.

The invention claimed is:

1. A conveyor belt wear monitoring system comprising:
   a non-contact sensor disposed facing a surface of a cover rubber of a conveyor belt, the non-contact sensor being configured to detect a distance to the surface of the cover rubber in a predetermined range in a belt width direction;
   a calculation unit into which detection data from the non-contact sensor is inputted; and
   a flapping prevention member that comes into contact with a surface of the cover rubber on an opposite side of the surface of the cover rubber detected by the non-contact sensor; wherein
   the flapping prevention member is arranged, on a return side of the conveyor belt stretched between a pair of pulleys, in a position corresponding to a detection range detected by the non-contact sensor;
   the non-contact sensor and the flapping prevention member are arranged opposite each other with the conveyor belt therebetween; and
   the calculation unit obtains an amount of wear of the cover rubber by comparing pre-stored reference data with the detection data.

2. The conveyor belt wear monitoring system according to claim 1, further comprising:
   a scraper that comes into contact with the surface of the cover rubber detected by the non-contact sensor,
   wherein the non-contact sensor detects the distance to the surface of the cover rubber after the surface passes the scraper due to travel of the conveyor belt.

3. The conveyor belt wear monitoring system according to claim 1, wherein:
   the non-contact sensor comprises a plurality of non-contact sensors, and
   the non-contact sensors are arranged at intervals in a width direction of the conveyor belt.

4. The conveyor belt wear monitoring system according to claim 1, wherein:
   the non-contact sensor comprises a plurality of non-contact sensors, and
   the non-contact sensors are arranged in a plurality of positions at intervals in a longitudinal direction of the conveyor belt.

5. The conveyor belt wear monitoring system according to claim 1, further comprising:
   a reference member fixed to a reference position of the conveyor belt; and
   a position sensor fixed near the conveyor belt,
   wherein the position sensor detects the reference member that moves as the conveyor belt travels, and on a basis of a detection signal from the position sensor and a travel speed of the conveyor belt, a position in a circumferential direction of the conveyor belt having the obtained amount of wear is identified.

6. The conveyor belt wear monitoring system according to claim 2, wherein:
   the non-contact sensor comprises a plurality of non-contact sensors, and
   the non-contact sensors are arranged at intervals in a width direction of the conveyor belt.

7. The conveyor belt wear monitoring system according to claim 6, wherein:
   the non-contact sensor comprises a plurality of non-contact sensors, and
   the non-contact sensors are arranged in a plurality of positions at intervals in a longitudinal direction of the conveyor belt.

8. The conveyor belt wear monitoring system according to claim 7, further comprising:
   a reference member fixed to a reference position of the conveyor belt; and
   a position sensor fixed near the conveyor belt,
   wherein the position sensor detects the reference member that moves as the conveyor belt travels, and on a basis of a detection signal from the position sensor and a travel speed of the conveyor belt, a position in a circumferential direction of the conveyor belt having the obtained amount of wear is identified.

9. The conveyor belt wear monitoring system according to claim 1, wherein the non-contact sensor is a laser sensor, an ultrasonic sensor, or an image sensor.

* * * * *